F. H. MOYER.
SIDE FRAME.
APPLICATION FILED NOV. 15, 1919.

1,349,624.

Patented Aug. 17, 1920.

INVENTOR
Fredellia H. Moyer.
BY Geo. E. Thackray
ATTORNEY

UNITED STATES PATENT OFFICE.

FREDELLIA H. MOYER, OF WESTMONT BOROUGH, PENNSYLVANIA.

SIDE FRAME.

1,349,624.	Specification of Letters Patent.	Patented Aug. 17, 1920.

Application filed November 15, 1919. Serial No. 338,401.

*To all whom it may concern:*

Be it known that I, FREDELLIA H. MOYER, a citizen of the United States, and a resident of the borough of Westmont, county of Cambria, and State of Pennsylvania, (whose post-office address is Johnstown, Pennsylvania,) have invented certain new and useful Improvements in Side Frames; and I do hereby declare the following to be a full, clear, and exact description of the invention, such as will enable others skilled in the art to which it appertains to make and use the same.

My invention relates to a side-frame for use in railroad car trucks with particular reference to those of four-wheel trucks for heavy freight cars of modern types.

My truck-frame is made unitary or in one piece, thereby distributing the stresses to the various parts in the most practical and economic manner, while at the same time reducing to the minimum the number of parts required and, of course, eliminating all wearing points between the different parts by reason of my one-piece construction. My truck-frame is also made with a smooth exterior with rounded corners and is both pleasing in appearance and eminently practical.

In general, I manufacture my side-frame by first taking a pair of steel plates and shearing them to the general outline required, then forming them in a press while they are heated or unheated, as may be desired, in such a way as to form two shallow pans. The edges of the sheets forming the pans are then preferably beveled or scarfed in any suitable manner and the two parts are placed together with their edges abutting and are then welded together preferably by an acetylene blow-pipe or electrically. In order that this should be done to the best advantage, I may introduce in the V-shape junction between the edges, a wire or bar of soft steel or iron, which, when fused, is welded to both the edges and firmly secures them together. After this is accomplished I may, if desired, trim off the slight protuberances in order to give a finished appearance, or these may remain to add to the strength where finished appearance is not necessary. I may also secure pedestal tie bars, brake beam hangers or other appurtenances to my side truck frame by inserting bars or headless rivets within suitable holes and welding the same instead of using the usual headed bolts or rivets.

Having thus given a general description of my invention, I will now, in order to make the matter more clear, refer to the annexed sheet of drawings in which like characters refer to like parts:—

Figure 1:
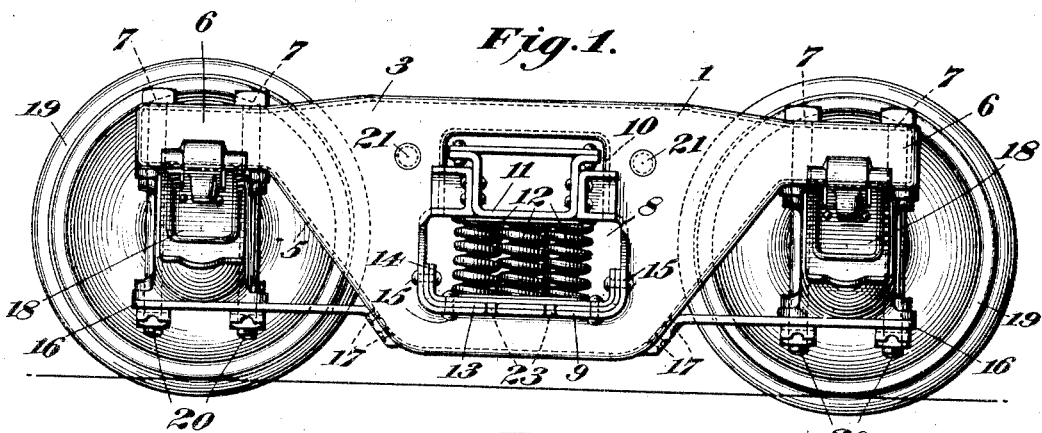
Figure 2:
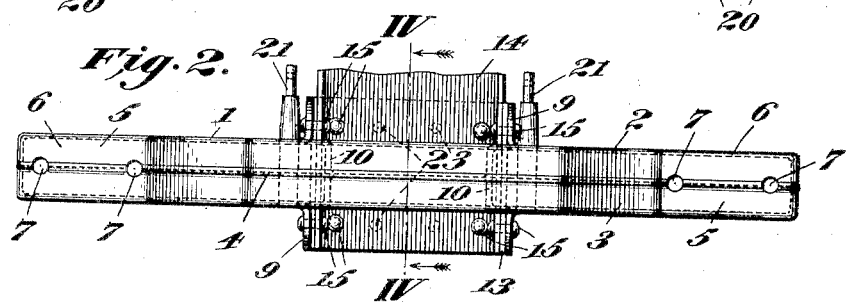
Figure 3:
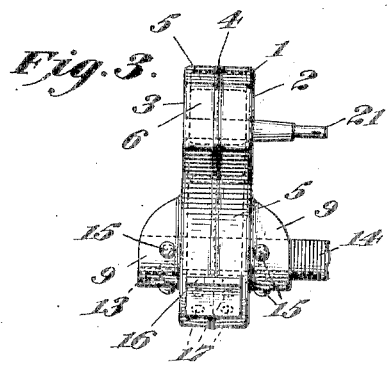
Figure 4:
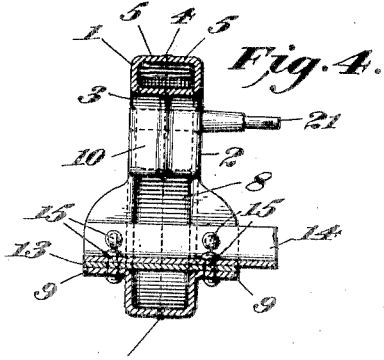
Figure 5:
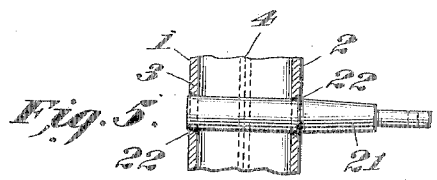

Figure 1 is a side elevation of a railway car truck provided with a side-frame embodying my invention; Fig. 2 is a top plan view of the side-frame; Fig. 3 is an end elevation; Fig. 4 is a vertical transverse sectional elevation taken on the line IV—IV of Fig. 2; Fig. 5 is a detail sectional elevation showing the manner of welding the brake beam hanger carriers to the side frame and drawn on a large scale; and Fig. 6 is a detail section through the top central portion of the side frame taken on the same line as Fig. 4, but drawn on a larger scale to show more clearly the manner of welding the two halves of the side-frame together.

Figure 6:
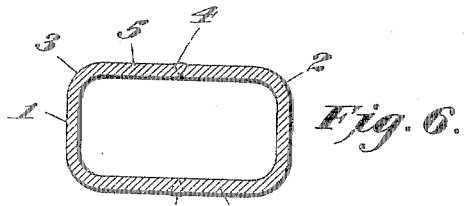

Referring now to the numbers of reference on the drawings:—1 is the side frame in general, 2 is the inner half thereof, 3 is the outer half, 4 is the place of juncture or welding of the two halves, 5 are flanges of the frames which, as shown, abut together and are secured by welding as particularly illustrated at 4 in Fig. 6. The ends of the side-frame are 6 and these are provided with bolt holes 7 therethrough in order to receive the journal box bolts, 8 is the spring seat opening, 9 are outwardly extending flanges formed integral with the side frame adapted to receive the spring seat and spring plank, 10 are inwardly extending flange portions integral with the side frame and adapted to receive the column guides which abut against the same, 11 is the end of the bolster which may be of any customary form, 12 are the bolster springs formed in a nest, as illustrated, 13 is a spring supporting plate which is adapted to reinforce the truck and is secured thereto by headless rivets welded therein, as illustrated, 14 is a spring plank which is also secured to the side truck frame by means of the rivets 15, which also further secures the bent plate 13 to the flanges 9. 16 are the pedestal tie bars which serve to brace the frame and are secured to the side frame by means of headless rivets or pins 17 welded to both, 18 are the journal boxes, 19 are the wheels, 20 are the journal box bolts, 21 is a brake beam hanger carrier which is welded into the frame as indicated at 22 in Fig. 5.

As illustrated, 23 are headless rivets or pins or spot welds which serve to secure the spring supporting plate 13 to the integral flanges 9 of the truck frame so that this becomes a unitary part thereof. I may secure the spring plank to the truck by headless rivets or pins or by spot welding to the truck-frame but I prefer to secure the spring plank thereto by means of the headed rivets 15, as illustrated, as these can be more easily taken out or replaced by the ordinary workman with the usual tools at repair points.

By means of my invention I produce a side-frame for a truck which is substantially integral and in one piece, even to the pedestal tie bars which may be integrally united thereto, and as the line of juncture between the two pan-shaped portions of my side-frame is located at such a point that it is not subjected to any severe stresses, the structure is well adapted for the use intended and not subject to deteriorations, wear and looseness of parts of the built-up type, whether they be of the arch-bar or other forms.

My one-piece side-frame is also superior to a cast steel frame as it is formed of steel of previously known qualities, of fine grain, high tensile strength, ductility and elongation, and without the shrinkage stresses of cast frames, and, in consequence, can be made lighter and thus lessen the dead load of the car which is a feature much to be desired.

Although I have described and illustrated my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described my invention, what I claim and desire to secure by Letters Patent is:—

1. A truck-frame formed of two plates of metal with integral flanges projecting from the edges thereof, the edges of said flanges being abutted and welded together.

2. A side-frame for trucks comprising a pair of pan-shaped members formed of rolled steel plates with continuous flanges around all the edges thereof, the edges of said flanges being abutted and welded together.

3. A truck-frame comprising a pair of pan-shaped members with integral flanges projecting at an angle to the body thereof, said edges being abutted and welded together, and other integral flanges extending outwardly from the central portion thereof to form a support for the spring seat and connection for the spring plank.

4. A truck-frame formed of two plates of metal with integral flanges projecting from the edges thereof, the edges of said flanges being abutted and welded together, and brake hanger carriers inserted in openings through said plates and welded thereto.

5. A truck-frame formed of two plates of metal with integral flanges projecting from the edges thereof, the edges of said flanges being abutted and welded together, and pedestal tie bars integrally united to said truck-frame by pins welded thereto and to said pedestal tie bars.

6. A truck-frame comprising a pair of pan-shaped members, the edges of which are welded together, integral flanges outwardly projecting from the intermediate portion thereof, and a spring plank seat secured to said flanges by welding.

7. A truck-frame comprising a pair of pan-shaped members, the edges of which are welded together, integral flanges outwardly projecting from the intermediate portion thereof, a spring plank seat welded to said flanges and a spring plank secured thereto by headed rivets.

8. A truck-frame comprising a pair of pan-shaped members, the edges of which are welded together, integral flanges outwardly projecting from the intermediate portion thereof, a spring plank seat and spring plank welded thereto.

In witness whereof I hereunto affix my signature.

FREDELLIA H. MOYER.